US008794927B2

(12) United States Patent
Vassilicos

(10) Patent No.: US 8,794,927 B2
(45) Date of Patent: Aug. 5, 2014

(54) FLUID FLOW MODIFICATION APPARATUS AND METHOD OF MANUFACTURE

(71) Applicant: Imperial Innovations Ltd, London (GB)

(72) Inventor: John Christos Vassilicos, London (GB)

(73) Assignee: Imperial Innovations Ltd, London (GB)

( * ) Notice: Subject to any disclaimer, the term of this patent is extended or adjusted under 35 U.S.C. 154(b) by 0 days.

(21) Appl. No.: 13/779,578

(22) Filed: Feb. 27, 2013

(65) Prior Publication Data
US 2013/0170999 A1 Jul. 4, 2013

Related U.S. Application Data

(63) Continuation of application No. PCT/GB2011/051794, filed on Sep. 22, 2011.

(30) Foreign Application Priority Data

Sep. 30, 2010 (GB) .................................. 1016455.6

(51) Int. Cl.
*F03D 11/00* (2006.01)
*B64C 11/18* (2006.01)
(52) U.S. Cl.
USPC .................. 416/228; 416/235; 416/236 R
(58) Field of Classification Search
USPC .......... 416/224, 228, 235, 236 R, 236 A, 237, 416/DIG. 2
See application file for complete search history.

(56) References Cited

U.S. PATENT DOCUMENTS

| 5,088,665 A | 2/1992 | Vijgen et al. |
| 5,533,865 A | 7/1996 | Dassen et al. |
| 7,065,957 B2 | 6/2006 | Balzer |
| 2008/0014342 A1 | 1/2008 | Jakobi et al. |
| 2008/0134665 A1 | 6/2008 | Birch et al. |
| 2010/0226202 A1 | 9/2010 | Vassilicos et al. |
| 2011/0080802 A1 | 4/2011 | Vassilicos et al. |

FOREIGN PATENT DOCUMENTS

| EP | 1112928 A2 * | 7/2001 |
| GB | 2372018 A | 8/2002 |
| WO | 1338793 A2 | 8/2003 |
| WO | 2004048871 A2 | 6/2004 |
| WO | 2007113335 A2 | 10/2007 |
| WO | 2003340 A2 | 12/2008 |
| WO | 2009124939 A1 | 10/2009 |
| WO | 2010144181 A1 | 12/2010 |

OTHER PUBLICATIONS

PCT/GB2011/051794 International Search Report dated Feb. 1, 2012, (3 pages).
GB1120618.2 Search Report dated Feb. 22, 2012, (1 page).
A. Abou El-Azm Aly, et al., Experimental Study of the Pressure Drop After Fractal-Shapes Orifices in Turbulent Pipe Flows, Experimental Thermal and Fluid Science 34, Jan. 2010, pp. 104-111.
Mike M. Kearney, Engineered Fractels Enhanced Process Applications, On the Horizon, Dec. 2000, pp. 61-68, XP-000977893.

* cited by examiner

*Primary Examiner* — Edward Look
*Assistant Examiner* — Jesse Prager
(74) *Attorney, Agent, or Firm* — Conley Rose, P.C.

(57) ABSTRACT

A fluid flow modification apparatus (10) has a surface (15), the surface having an edge (65) of length Y over or past which a fluid can flow in use. The edge (65) has a virtual boundary (30) of length X where Y is greater than X. At least a first portion of the apparatus (10) within the virtual boundary (30) comprises an opening (55) and at least a second portion of the apparatus (10) comprises a projection (60) which extends beyond the virtual boundary (30) to provide the edge (65). The edge (65) is multi-scale.

18 Claims, 18 Drawing Sheets

FLUID FLOW MODIFICATION APPARATUS AND METHOD OF MANUFACTURE

CROSS-REFERENCE TO RELATED APPLICATION

The present application is a continuation of and claims priority to International Patent Application No. PCT/GB 2011/051794 filed Sep. 22, 2011, entitled "Fluid Flow Modification Apparatus and Method of Manufacture", claiming priority to GB Patent Application No. 1016455.6 filed. Sep. 30, 2010, which is hereby incorporated by reference in its entirety.

TECHNICAL FIELD

The present invention relates to a fluid flow modification apparatus and a method of manufacturing a fluid flow modification apparatus.

BACKGROUND

It is well-known that fluid flow modification apparatus comprising openings, for example baffles, can be used to affect fluid flow, and in particular can modify flow of fluid through a conduit in which they are located. Such control of fluid flow has many applications, including for example ventilation and fluid mixing.

Similarly, fluid flow modification apparatus is often used to control fluid flow around bodies, such as fluid flow around aircraft, fluid flow around motor vehicles and fluid flow in mixing apparatus. Particular fluid flow characteristics that are often controlled by fluid flow modification apparatus include flow speed, flow direction, energy transfer and noise.

Many factors can be adjusted to affect fluid flow through openings and around fluid flow modification apparatus, including the geometry of the fluid flow path, the fluid properties, the surrounding temperature and the speed at which the fluid flows.

Examples of existing types of fluid flow modification apparatus are described in WO-A-2007/113335 and WO-A-2009/124939. Examples of fluid flow modification apparatus used in particular as part of wind turbine blades are disclosed in EP-A-1338793 and as part of aircraft wings in U.S. Pat. No. 5,088,665.

SUMMARY

According to a first aspect of the present invention, there is provided a fluid flow modification apparatus having a surface, the surface having an edge of length Y over or past which a fluid can flow in use, the edge having a virtual boundary of length X such that at least a first portion of the apparatus within the virtual boundary comprises an opening and such that at least a second portion of the apparatus comprises a projection which extends beyond the virtual boundary to provide the edge, where Y is greater than X, the edge being multi-scale.

By virtue of having a multi-scale edge, significant and/or complex changes can be made to the flow of a fluid in use over or past the edge, and the range of parameters by which fluid flow can effectively be controlled is increased, giving more flexibility and control to designers and users of the fluid flow modification apparatus. This has many applications, including applications in the field of aeronautics, motor racing, static and dynamic mixing, ventilation, noise reduction and distillation. There are for example many situations where it is of advantage for the edge of the surface to be as long as possible, and in many cases for this to be achieved without having to increase the area of the surface (relative to a comparable prior art arrangement). This is made possible with use of the multi-scale edge of embodiments of the present invention. Indeed, it is even possible effectively to increase the length of the edge (relative to a comparable prior art arrangement) whilst decreasing the area of the surface if desired, though in some cases it may be desirable to increase the area.

In an embodiment, the multi-scale edge is formed by the first portion and the second portion being on opposite sides of the virtual boundary, the first projection and the first opening defining in part a second virtual boundary having a length greater than the length of the first virtual boundary and less than the length Y of the edge, and by at least one of the first projection and the first opening having at least one of a second projection and a second opening extending from the second virtual boundary. In an embodiment, the multi-scale edge is formed by the at least one of a second projection and a second opening being part of a third virtual boundary having a length greater than the length of the second virtual boundary and less than the length Y of the edge, and by at least one of a third projection and a third opening extending from the third virtual boundary. As discussed in more detail below, this can be repeated for yet further "iterations", to increase further the number of scales of the edge projections/openings, which can further improve the characteristics of the modified fluid flow.

In an embodiment, the multi-scale edge is formed by at least one of the first portion and the second portion having a perimeter that is of irregular shape. In another embodiment, the multi-scale edge is formed by at least one of the first portion and the second portion having a perimeter that is multi-scale.

In an embodiment, the apparatus comprises plural first portions and plural second portions. This provides greater flexibility in the control of fluid flow by the fluid flow modification apparatus.

In an embodiment, the area of the surface enclosed by the virtual boundary is substantially the same as the area of the surface enclosed by the actual perimeter of the surface.

In an embodiment, the edge is a trailing edge of the surface. Providing a trailing edge (i.e. an edge that is, in general terms at least, the final downstream edge of the surface) that is multi-scale has a number of advantages, depending on the particular application, including for example potentially improving the lift/drag properties of the surface and/or reducing the noise generated as a fluid flows over the surface. By way of example, such a surface may be used as or as part of an aircraft wing, a vehicle spoiler or a wind turbine blade. The vehicle spoiler may be the main spoiler or "wing", typically found towards the rear of the vehicle, the front spoiler found on some racing vehicles, or may be one of the smaller spoilers or "flaps" found elsewhere on some vehicles.

In an embodiment, the surface has plural edges, at least two of the edges being multi-scale.

There is also provided, a vehicle spoiler comprising a fluid flow modification apparatus as described above. There is also provided an aircraft wing comprising a fluid flow modification apparatus as described above. There is also provided a wind turbine blade comprising a fluid flow modification apparatus as described above. There is also provided a fluid mixing apparatus comprising a fluid flow modification apparatus as described above.

According to a second aspect of the present invention, there is provided a method of manufacturing a fluid flow modification apparatus, the method comprising: forming an edge of a surface of the fluid flow modification apparatus to be multi-scale by: defining a first virtual boundary of the edge of the surface; selecting a first portion of the surface to be a first opening within the first virtual boundary; selecting a second portion of the surface to be a first projection extending beyond the first virtual boundary; defining a second virtual boundary of the edge of the surface; at least one of selecting a second portion of the surface to be a second opening within the second virtual boundary and selecting a second portion of the surface to be a second projection extending beyond the second boundary; the length of the second boundary being greater than the length of the first virtual boundary and less than the length of the edge of the surface; and manufacturing the fluid flow modification apparatus to have the multi-scale edge defined by the first opening and the first projection and the at least one of the second opening and second projection.

In an embodiment, the method comprises: defining a third virtual boundary of the edge of the surface; at least one of selecting a third portion of the surface to be a third opening within the third virtual boundary and selecting a third portion of the surface to be a third projection extending beyond the third boundary; the length of the third boundary being greater than the length of the second virtual boundary and less than the length of the edge of the surface; and manufacturing the fluid flow modification apparatus to have the multi-scale edge defined by the first opening and the first projection, the at least one of the second opening and second projection, and the at least one of the third opening and third projection.

According to a third aspect of the present invention, there is provided a fluid flow modification apparatus having a surface, the surface having a trailing edge over or past which a fluid can flow in use, the edge being formed with plural projections in which at least two of the projections have a different size and shape so that the edge is multi-scale.

Further features and advantages of the invention will become apparent from the following description of preferred embodiments of the invention, given by way of example only, which is made with reference to the accompanying drawings.

DETAILED DESCRIPTION

In the following, various examples of fluid flow modification apparatus according to embodiments of the present invention will be described, particularly with reference to the drawings. As will be explained further below, some of the drawings represent stages in for example the design of the fluid flow modification apparatus, whereas others represent stages and also examples of a finished, manufactured fluid flow modification apparatus. Some of the drawings may be regarded as being conceptual, or at least including parts that are conceptual, and are present so as to give a better understanding of the considerations required for a fluid flow modification apparatus according to the present invention and its design and manufacture.

Figure 1:
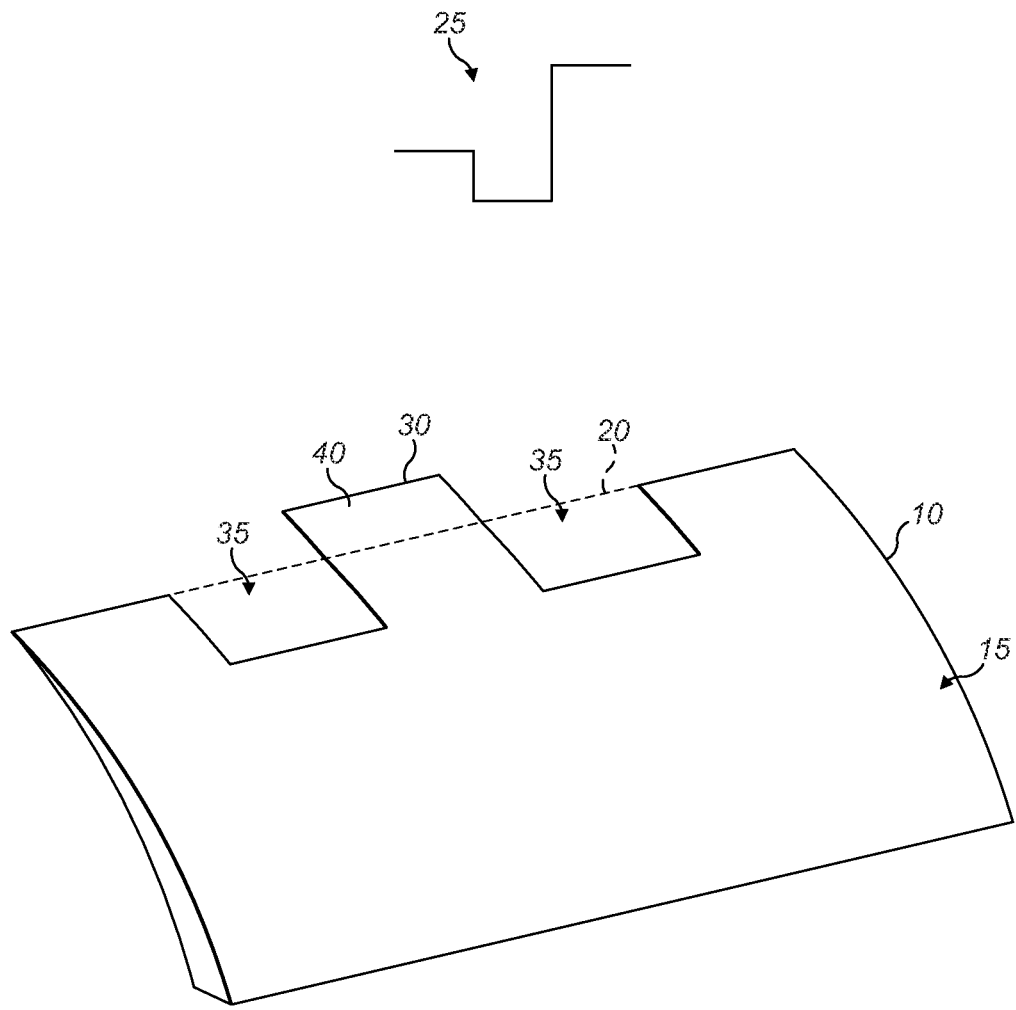
FIGS. 1 to 18 schematically show stages in the design and/or manufacture of examples of fluid flow modification apparatus according to embodiments of the present invention, and certain of FIGS. 1 to 18 show schematically examples of fluid flow modification apparatus according to embodiments of the present invention.

Referring first to FIGS. 1 to 4, there is shown in FIG. 1 a first stage in the design of an example of a fluid flow modification apparatus 10 according to an embodiment of the present invention. The fluid flow modification apparatus 10 has a surface 15 over or past which a fluid flows in use in the finished fluid flow modification apparatus 10. The surface 15 initially has an initial edge 20 in the initial design, the edge 20 being at least generally linear in this example.

As a first stage in the design of the finished fluid flow modification apparatus 10, a pattern 25 is superimposed on the initial edge 20. In the example shown in FIG. 1, this initial pattern 25 is generally in the form of a square wave, though, as discussed further below, other patterns can be used, having different "wave forms" and/or being regular or irregular, depending on the fluid flow modification characteristics required of the finished apparatus 10. The superposing of the pattern 25 on the edge 20 gives rise to a new edge 30 having one or more openings 35 and one or more projections 40 on opposed sides of the edge 20, this new edge 30 being longer than the initial edge 20.

Figure 2:
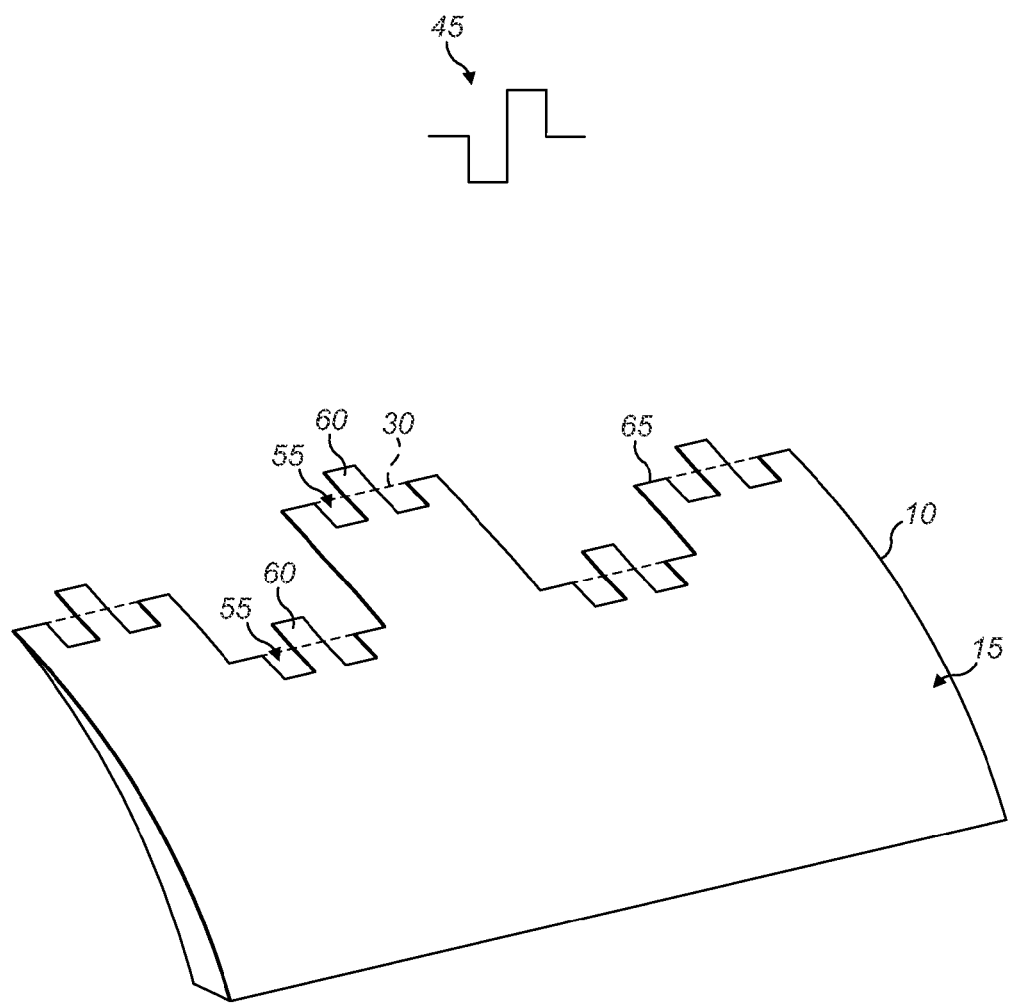

Referring now to FIG. 2, in an example of a second stage in the design of the finished fluid flow modification apparatus 10, a second pattern 45 is then superimposed at least in part over the edge 30 formed in the first stage. In this example, the second pattern 45 is again generally in the form of a square wave, though again, as discussed farther below, other patterns can be used. In this example, the second pattern 45 is superimposed only at the innermost and outermost edges of the openings 35 and projections 40 of the first stage respectively, though other arrangements are possible as discussed further below.

In FIG. 2, the edge 30 provided at the first stage is shown in part by dashed lines and can be regarded as a virtual boundary 30 such that the superposition of the second pattern 45 gives rise to one or more openings 55 and one or more projections 60 on opposite sides of the virtual boundary 30. In this case, these one or more openings 55 and one or more projections 60 are provided at the innermost and outermost edges of the openings 35 and projections 40 of the first stage respectively. The superposing of the second pattern 45 on the edge or first virtual boundary 30 gives rise to a new edge 65, which is longer than the first virtual boundary 30.

Figure 3:
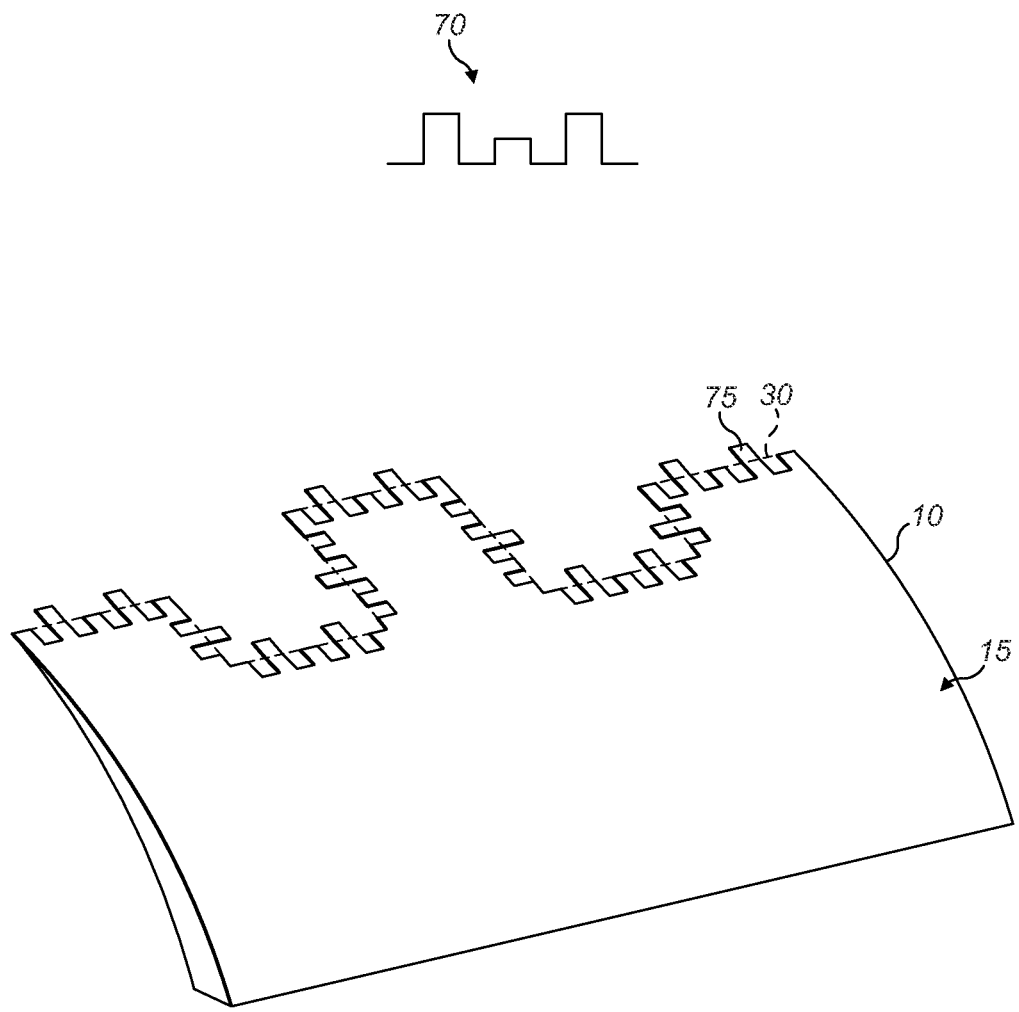

As just one example of a different design arrangement for the second stage or iteration. FIG. 3 shows a different waveform 70 which can be superimposed on the first virtual boundary 30. This example of the waveform 70 is generally in the form of a square wave, but with the amplitudes of adjacent peaks alternating between a maximum and a minimum. Moreover, the example of FIG. 3 shows how the waveform (in this case, the generally square wave 70) can be superimposed other than just at the innermost and outermost edges of the openings 35 and projections 40 of the first stage respectively, in this case the waveform 70 being superposed around the whole of the virtual boundary 30 and thus additionally running along the side walls of the openings 35 and projections 40 of the first stage. This gives rise to an actual edge 75 that has a relatively complex, multi-scale shape with many small and large projections/recesses.

The designs reached at the stages shown in FIGS. 2 and 3 each have multi-scale edges and represent designs of a fluid flow modification apparatus 10 that will suitable for at least some applications. Thus, the designs shown in FIGS. 2 and 3 can each be manufactured as actual fluid flow modification apparatus 10.

Figure 4:
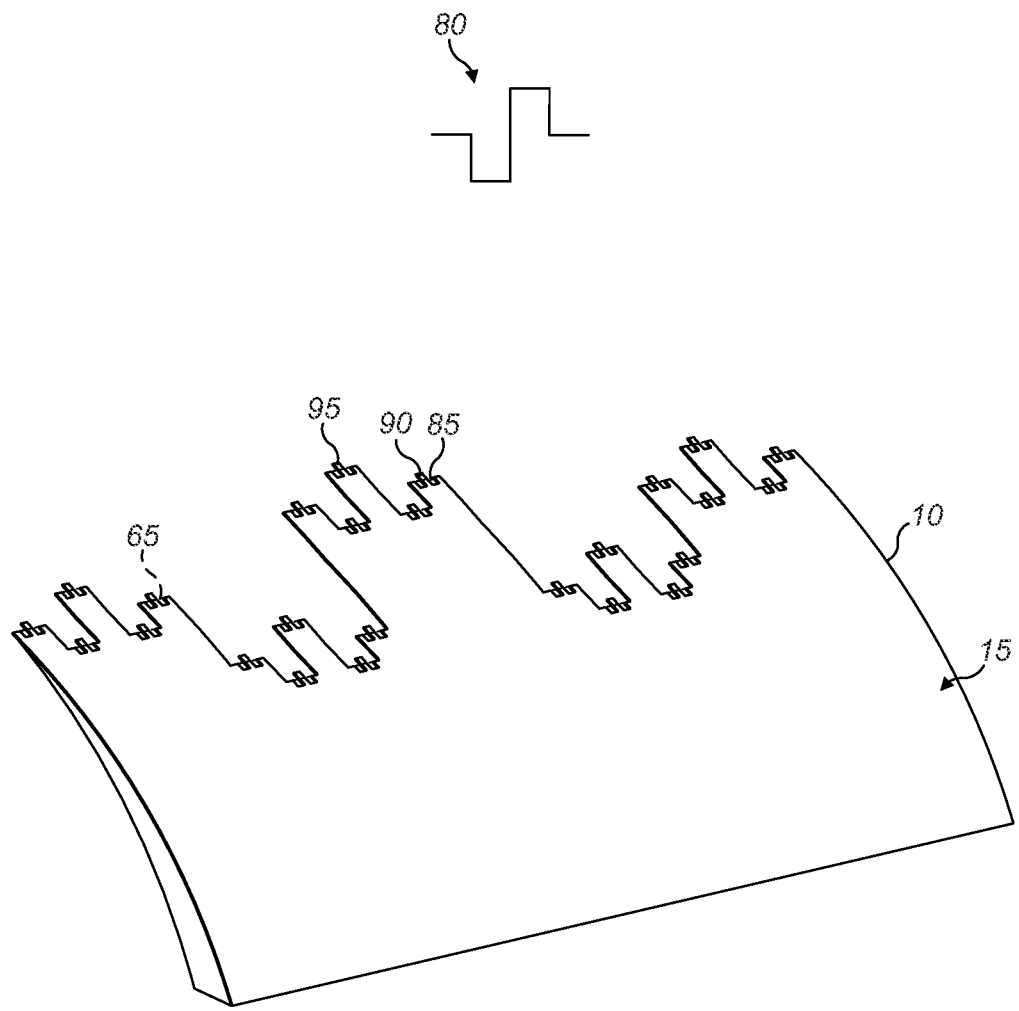

FIG. 4 shows an example of a third stage in the design of a finished fluid flow modification apparatus 10, which produces a more complex final edge, having a greater number of scales for the edge and its projections/recesses than the two-stage previous examples of FIGS. 2 and 3. In the example of FIG. 4, a further pattern 80 is superposed on the edge or second virtual boundary 65 produced in the previous, second stage (in this particular example, the stage reached in the example of FIG. 2). In this example, the third pattern 80 is again generally in the form of a square wave, though again, as discussed further below, other patterns can be used. In this example, the third pattern 80 is superimposed only at the innermost and outermost edges of the openings 55 and projections 60 of the second stage of FIG. 2 respectively, though again other arrangements are possible, such as around the whole or some other parts only of the edge or second virtual boundary 65. The superposition of the third pattern 80 gives rise to one or more openings 85 and one or more projections 90 on opposite sides of the second virtual boundary 65 at the innermost and outermost edges of the openings 55 and projections 60 of the second stage respectively. The superposing of the third pattern 80 on the edge or second virtual boundary 65 gives rise to a new edge 95, which is longer than the second virtual boundary 30.

As will be appreciated, the design reached at the third iteration of FIG. 4 may meet the fluid flow modification characteristics required of an apparatus 10 that will suitable for at least some applications. Thus, the design shown in FIG. 4 (or other designs reached at a similar third stage or iteration) can be manufactured as actual fluid flow modification apparatus 10. Alternatively, one or more further iterations may be applied to yield yet more complex multi-scale edges to the surface 15 of the apparatus 10.

As mentioned, other shapes for the waveforms to be superimposed at any of the stages or iterations are possible. These include for example other regular patterns, such as triangular, saw tooth, sine wave, scalloped (e.g. with semi circles), etc., or irregular patterns, which, in general, may have any shape that gives rise to a final edge that is multi-scale. The shapes to be superimposed may be the same across each stage or iteration in the design, or may differ for one or more of the stages or iterations. The stages or iterations can in principle be repeated any number of times (subject to practical limits), in the end providing an edge that can be regarded as fractalised or fractal-like. The term "fractal" may be understood here in the broadest sense of a geometrical structure that cannot be described by any non-multi-scale way.

Figure 5:
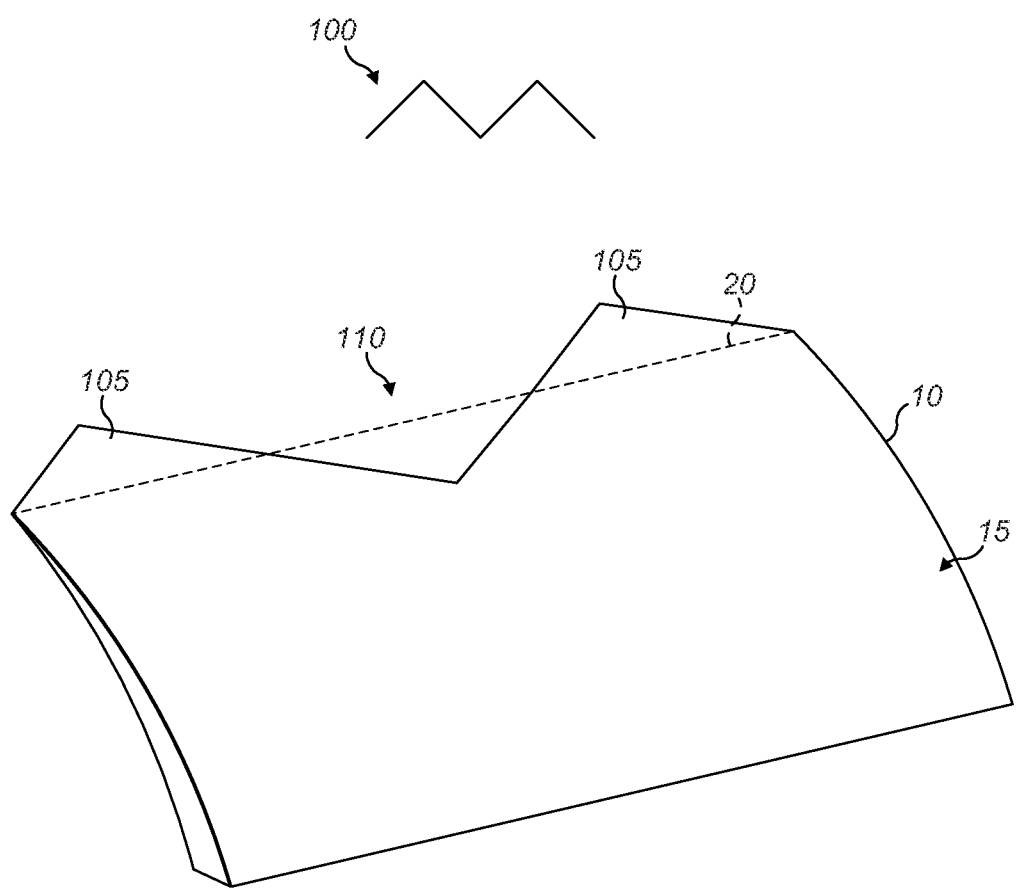

Thus, referring to FIG. 5, in this example of the first stage of the design of an example of a fluid flow modification apparatus 10 according to an embodiment of the present invention, a triangular waveform 100 is first superimposed on the edge 20 of the apparatus. In this example, the pitch and amplitude of the triangular waveform 100 is such as effectively to produce two triangular projections 105 with a single triangular recess 110 therebetween at the edge of the surface 15. As one further example, the example of FIG. 6 has a triangular waveform 115 superimposed that has a pitch and amplitude such as effectively to produce three triangular projections 120 at the edge of the surface 15, with triangular recesses 125 respectively therebetween. These principles can of course be extended to waveforms of different shapes, to produce in principle any number of projections at the edge of the surface, for one or more of the iterations that are involved in the design process.

Figure 6:
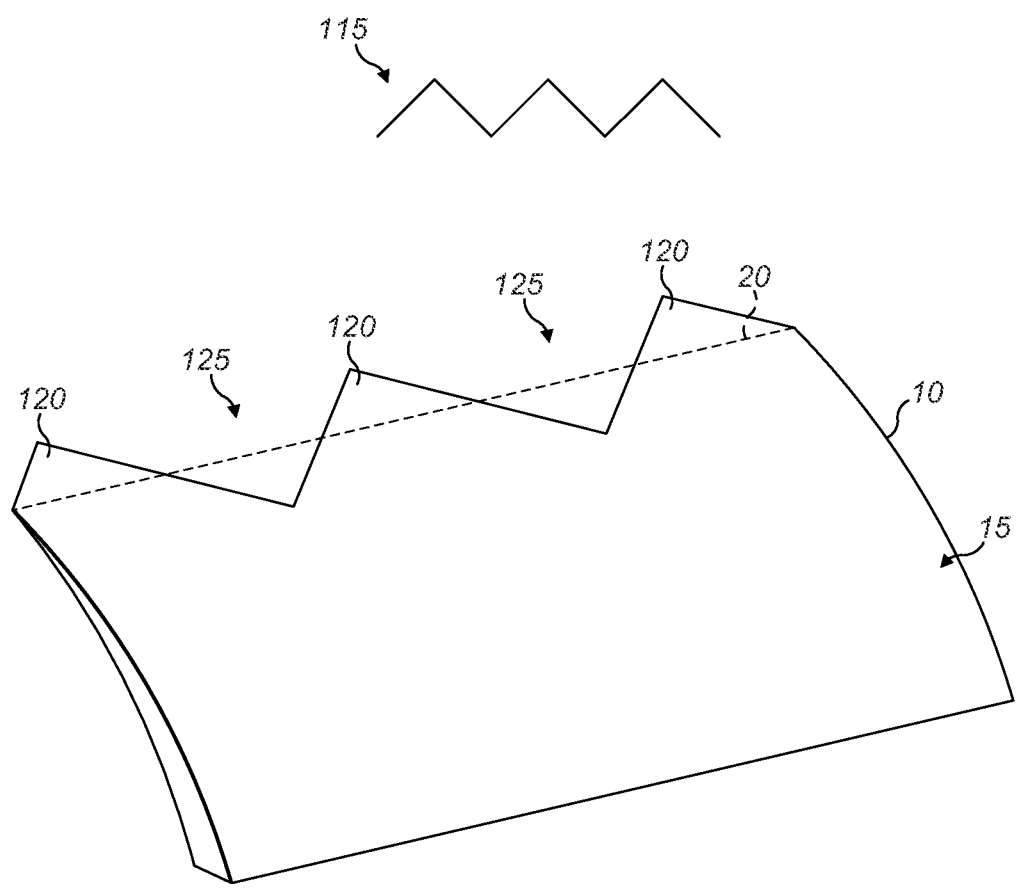
Figure 7:
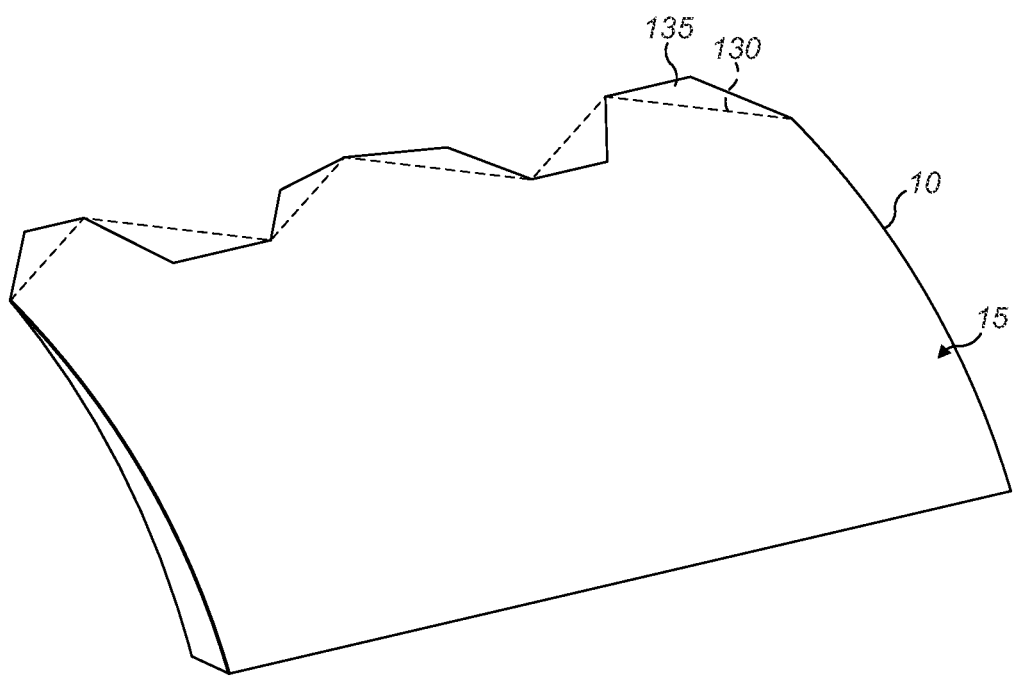
Figure 8:
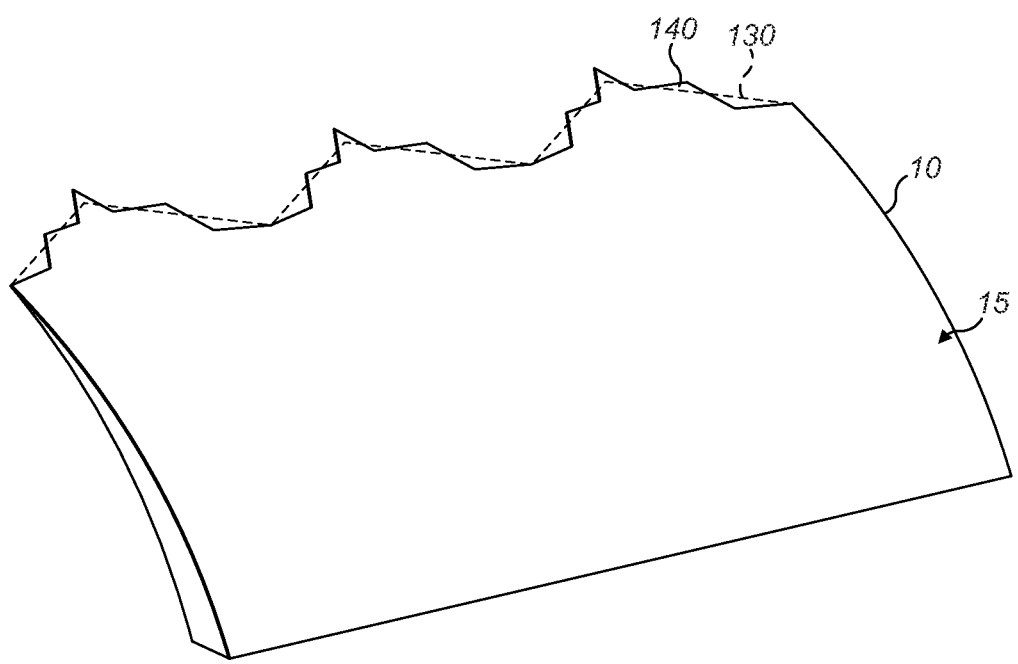

FIGS. 7 and 8 show examples of second stages in the design of the finished fluid flow modification apparatus 10 building on the first stage shown in FIG. 6. In each case, the edge 130 produced at the first stage is shown by dashed lines as a new virtual boundary. In each case, the second pattern that is superimposed on the virtual boundary 130 in these examples is a triangular waveform, though the examples here have a different pitch and amplitude and thus give rise to final edges 135, 140 having shapes that are very different from each other. As above, the result of these iterations may be used as the designs of a finished, fluid flow modification apparatus 10 which can be manufactured, or may be subject to one or more further iterations to produce edges that have a greater number of scales.

Figure 9:
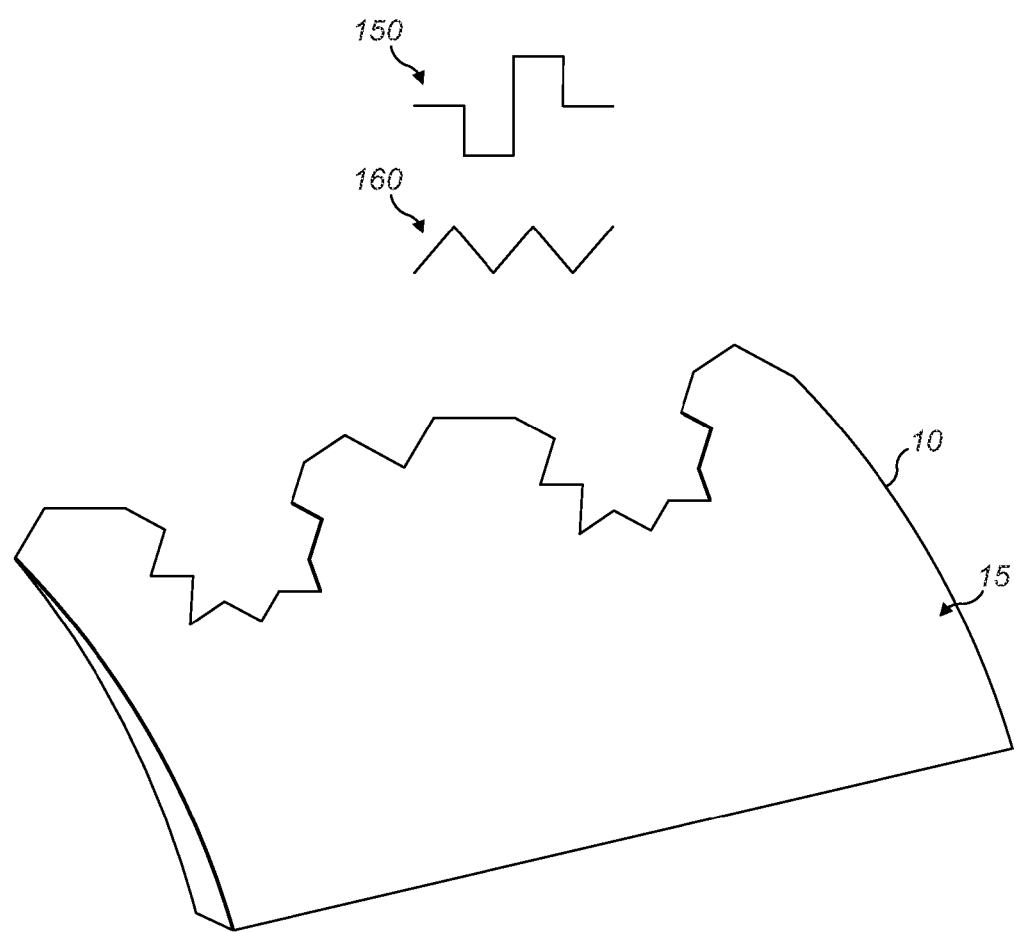
Figure 10:
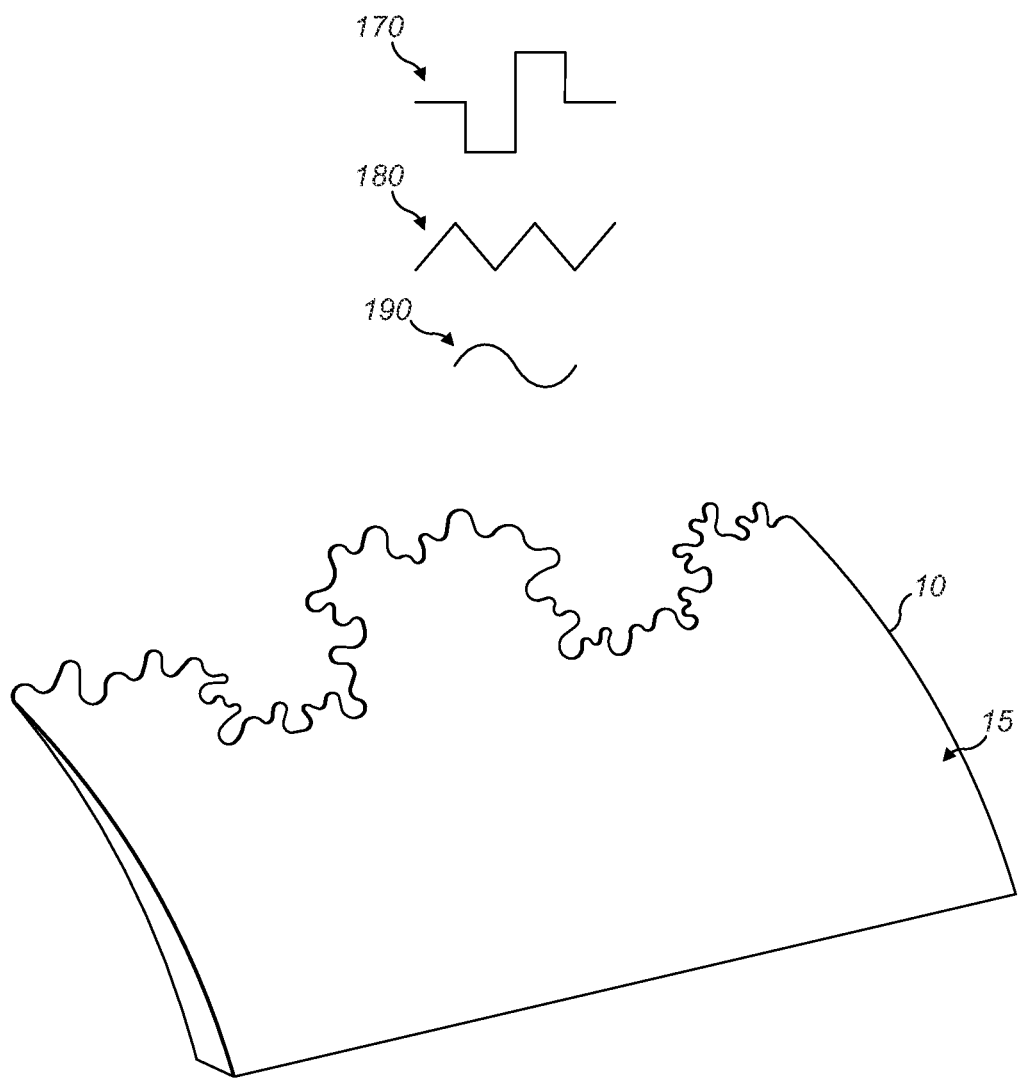

As further examples, FIG. 9 shows an example of a stage in the design of the finished fluid flow modification apparatus 10 in which the pattern 150 superimposed in the first iteration is a square wave and the pattern 160 superimposed in the second iteration is a triangular wave. FIG. 10 shows an example of a stage in the design of the finished fluid flow modification apparatus 10 in which the pattern 170 superimposed in the first iteration is a square wave, the pattern 180 superimposed in the second iteration is a triangular wave and the pattern 190 superimposed in the third iteration is a sine wave. Again, the point is made that the result of these iterations may be used as the design of a finished fluid flow modification apparatus 10 which can be manufactured, or may be subject to one or more further iterations to produce edges that have a greater number of scales.

Figure 11:
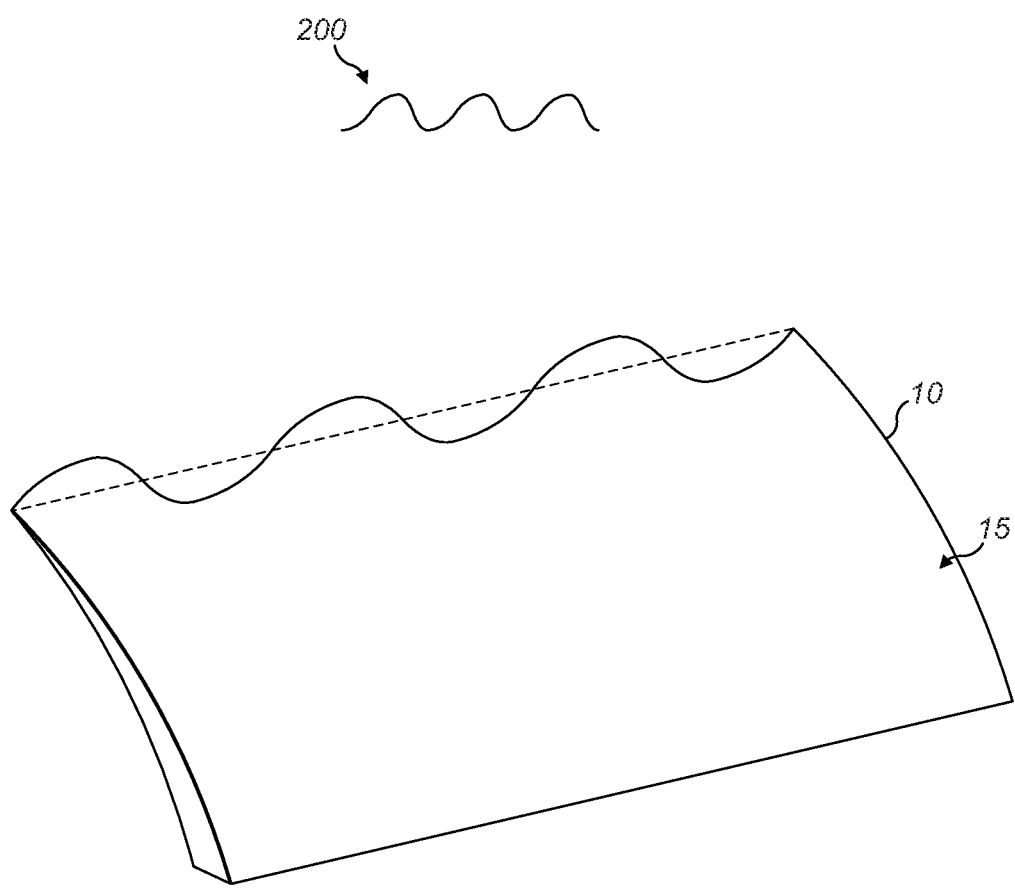
Figure 12:
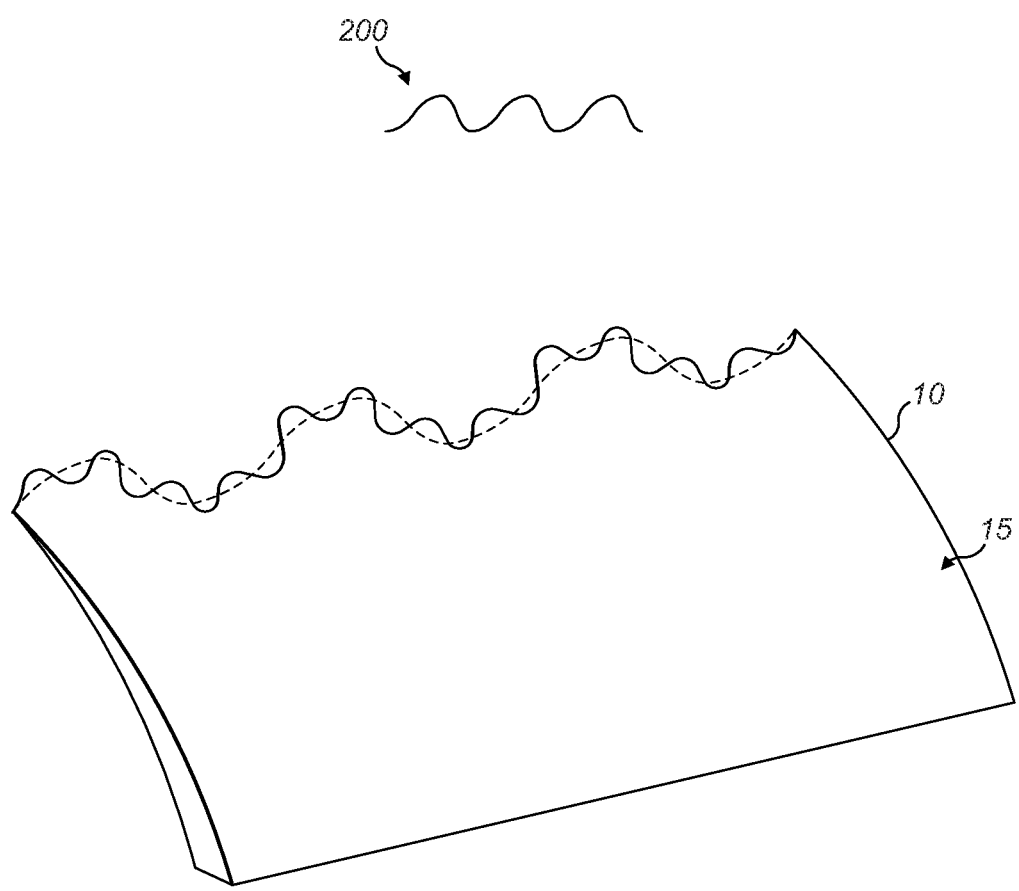
Figure 13:
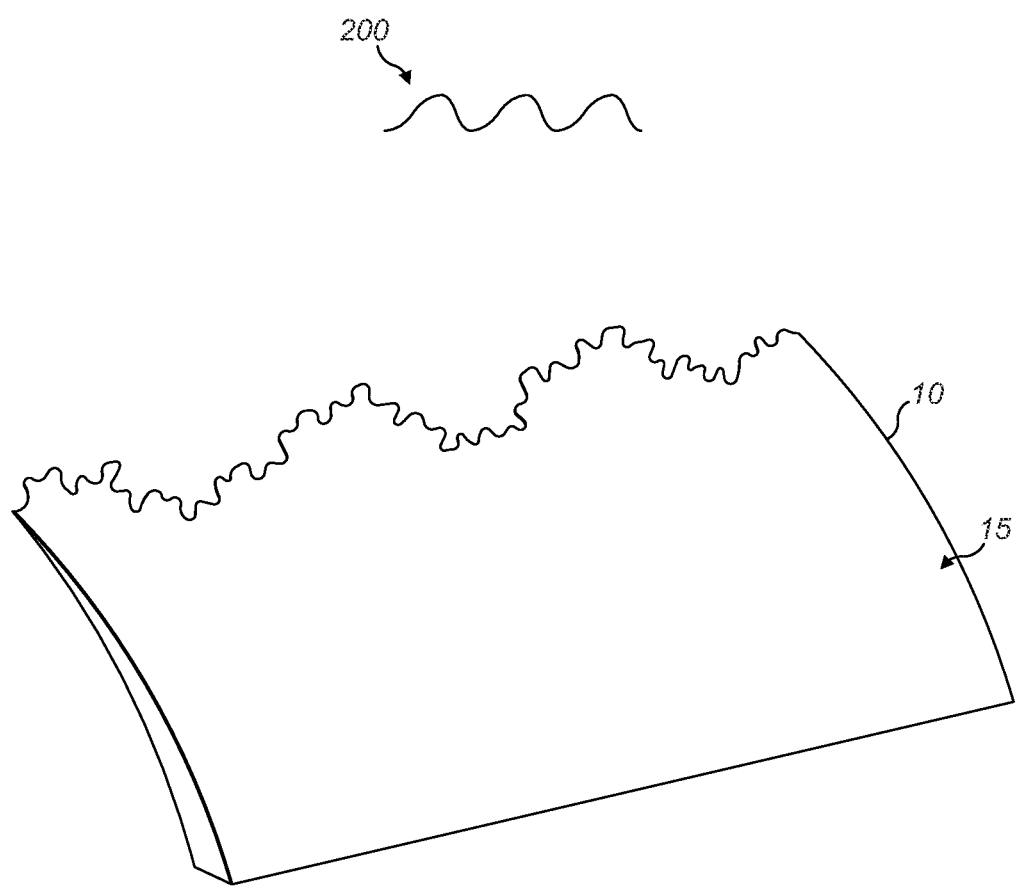
Figure 14:
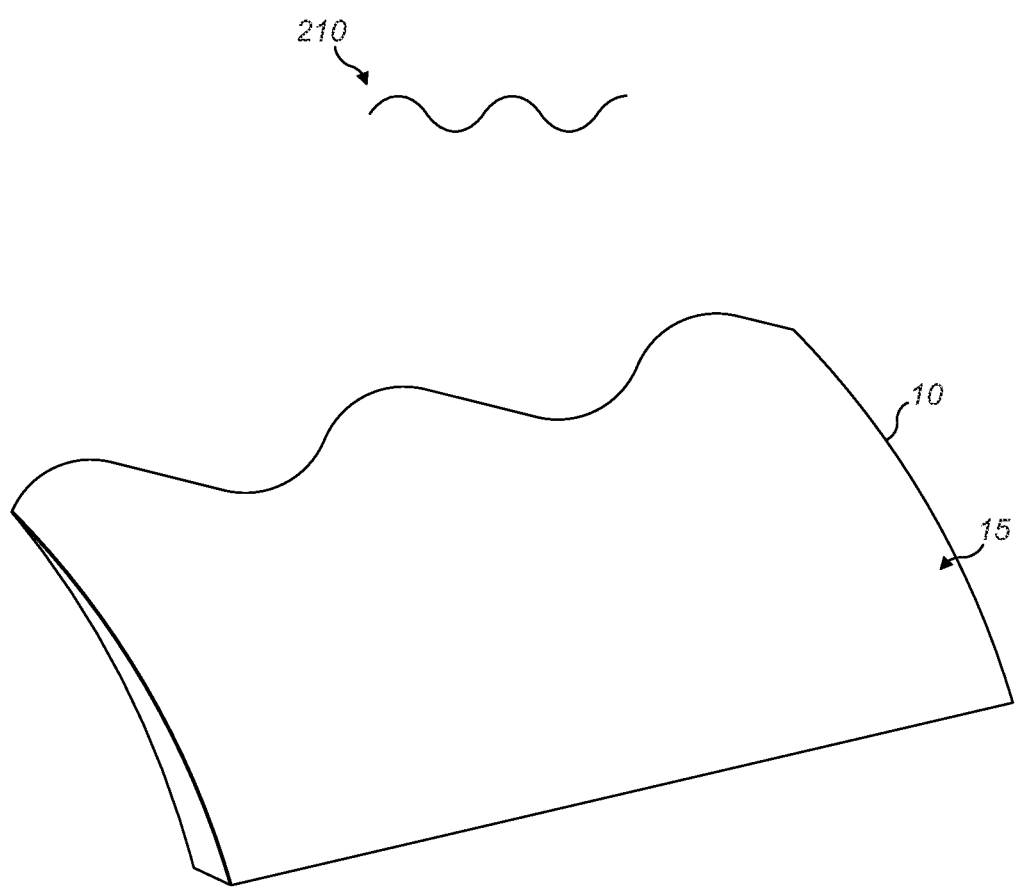
Figure 15:
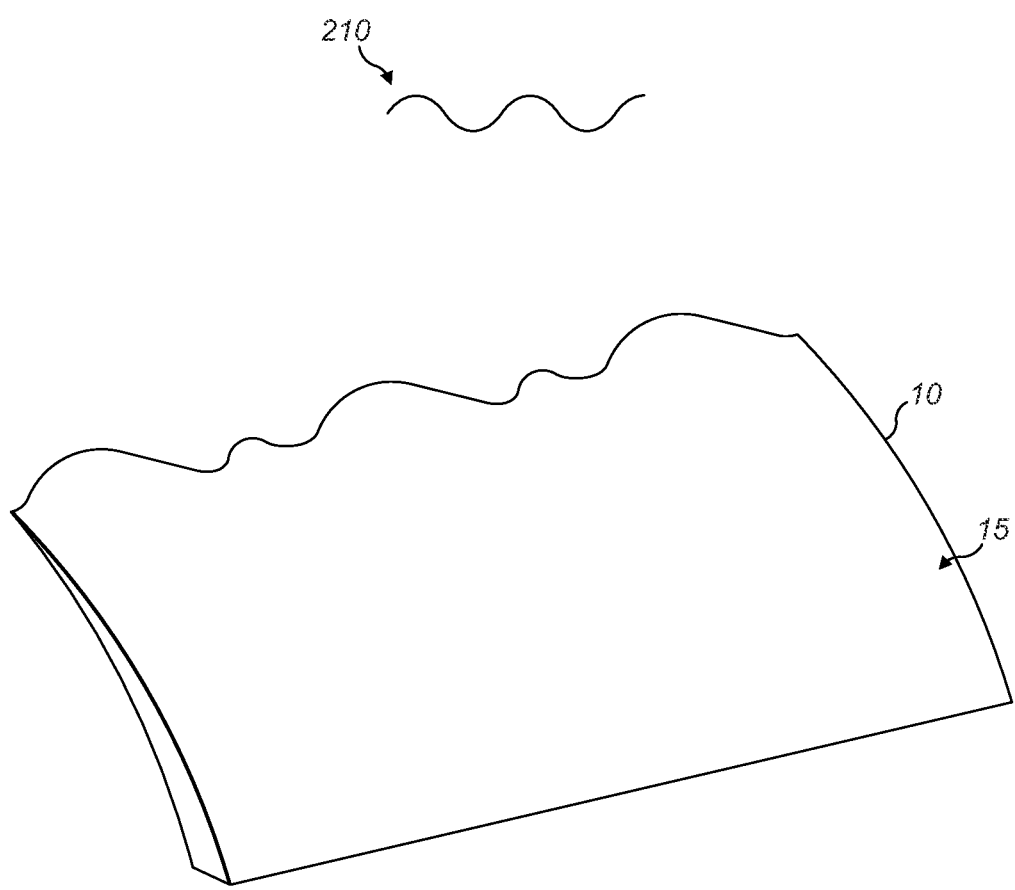
Figure 16:
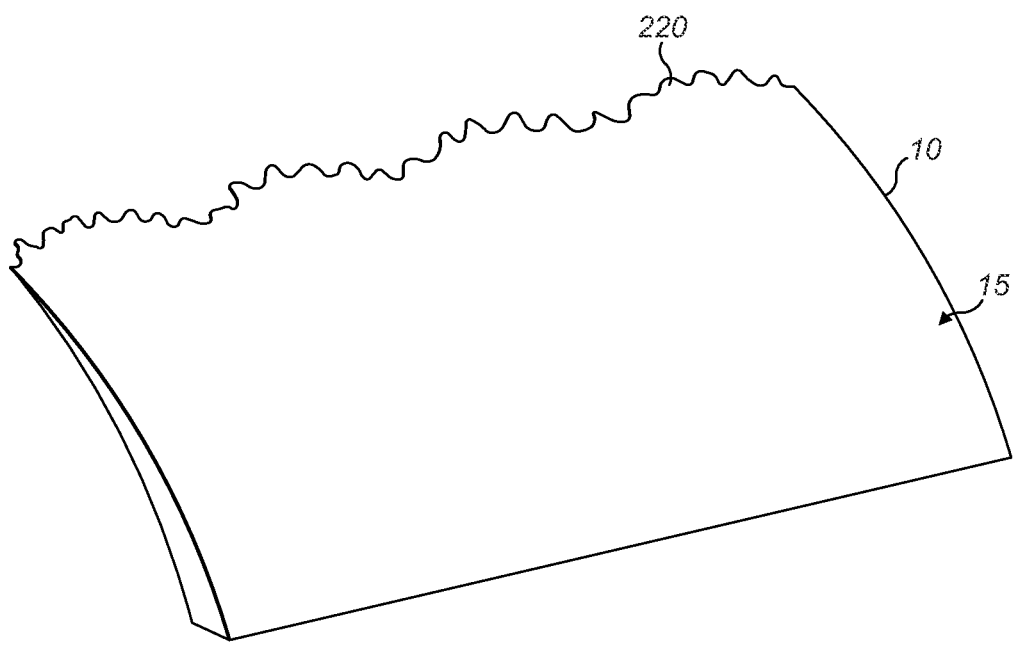

FIGS. 11 to 13 show examples of three iterations used to produce a design for another example of a fluid flow modification apparatus 10 according to an embodiment of the present invention. In each stage, the pattern 200 that is superimposed on the edge or virtual boundary of the previous stage is a wave pattern that is asymmetric passing left to right (along the wave). FIGS. 14 and 15 show examples of two iterations used to produce a design for yet another example of a fluid flow modification apparatus 10 according to an embodiment of the present invention. In each stage in this example, the pattern 210 that is superimposed on the edge or virtual boundary of the previous stage is a symmetric wave pattern (which in this case is generally sinusoidal). The point is made again that the result of these iterations of may of these examples may be used as the design of a finished fluid flow modification apparatus 10 which can be manufactured, or may be subject to one or more further iterations to produce edges that have a greater number of scales. As yet another example, FIG. 16 shows schematically an example of a fluid flow modification apparatus 10 according to an embodiment of the present invention in which the multi-scale edge 220 has an irregular profile in any case, the multi-scale edge of many examples can be regarded as being provided by having plural (and often many) projections where at least some of the projections have a different shape and/or size from each other.

Some or all of the various projections and openings on either side of the virtual boundaries produced at each stage or iteration may have the same shape and size as each other, may have the same shape but a different size from each other, or may have a size and shape that are both different.

All of these examples illustrate how variations in the shape of the patterns that are superimposed at any of the design stages or iterations can give rise to very different shapes to the edge of the manufactured fluid flow modification apparatus 10, and also the number of design stages or iterations can vary. This provides considerable design freedom and allows the fluid flow modification characteristics of the final manufactured apparatus 10 to be highly and precisely tailored if required. The edge can be multi-scale by virtue of for example having plural projections that are of different sizes and shapes, and/or projections that themselves are formed with (smaller) projections that are of different sizes and shapes, or indeed by an edge that is entirely or at least practically irregular in shape.

Figure 17:
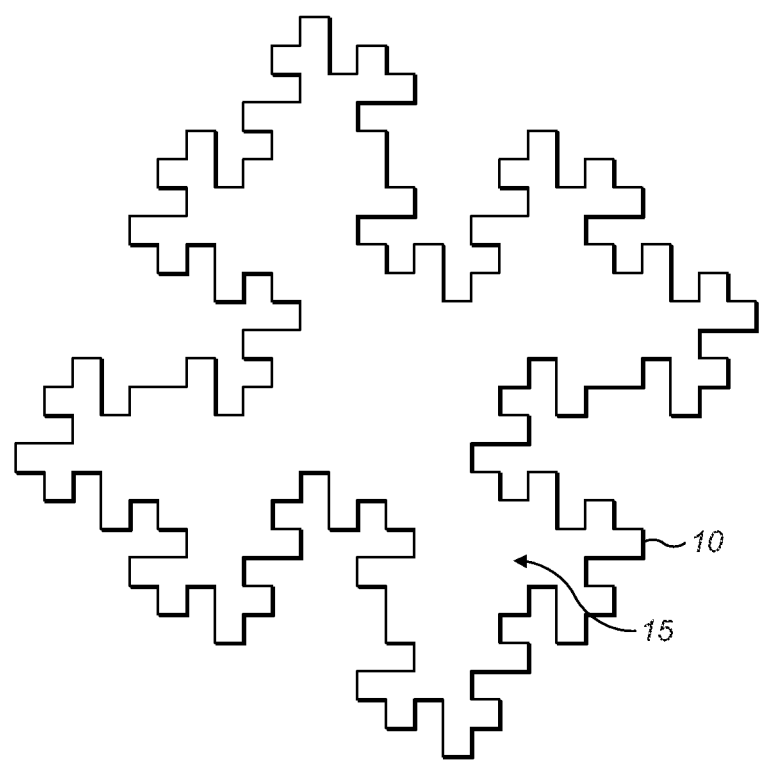
Figure 18:
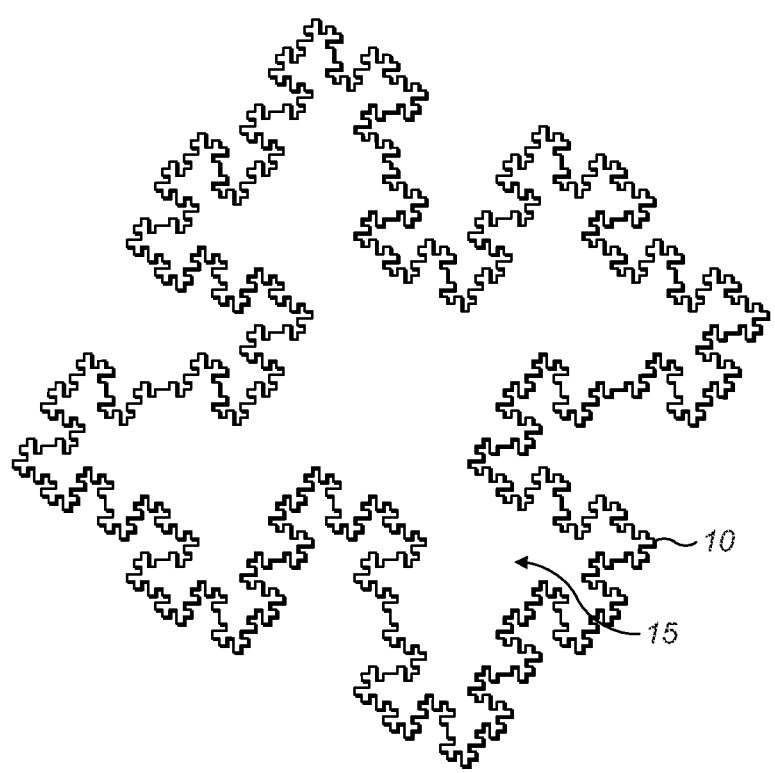

Yet further variations are possible. Each of the examples described above effectively has a single multi-scale edge, with the basic plan shape of the apparatus 10 being broadly rectangular (at least conceptually, or at the first, initial stage of the design process). The apparatus 10 may have a different overall shape and, at least for those that are at least broadly polygonal (such as triangular, quadrilateral (including square, rectangular, diamond, etc), pentagonal, hexagonal, etc., etc.), more than one edge may be multi-scale. Examples of this are shown in FIGS. 17 and 18, which show examples in which all edges of the apparatus 10 are multi-scale, the example of FIG. 18 effectively being manufactured after one further iteration than the example of FIG. 17 in the design process and therefore having one further degree of scale. The general shape need not be polygonal in some applications, and may be broadly circular, or oval, or other shape. One or more through holes may be provided through the apparatus 10, and/or indentations may be provided, in the surface 15. Such through holes and indentations may themselves have multi-scale edges or perimeters.

The presence of an edge of a fluid flow modification apparatus that is multi-scale has numerous potential advantages, depending on the application of the apparatus. As mentioned, the apparatus may be used as a baffle or mixer to affect or control fluid flow, for example to enhance the mixing of fluids flowing through a conduit or some other arrangement or control ventilation. This has numerous industrial applications, such as in industrial static and dynamic mixers. It is well known that a problem with industrial static mixers is their size, as often their length is so great that they cannot easily be accommodated in manufacturing sites. If mixing could be improved significantly so that the overall length of the static mixers could be reduced, this would be of great value. For example, mixing paddles could comprise the fluid flow modification apparatus described above. For some of these applications, an apparatus in which more than one and possibly all of its edges are multi-scale may be the most appropriate, depending on for example how the apparatus is incorporated into or supported by the fluid flow apparatus or conduit, etc.

Multiple fluid flow modification apparatus 10 could be arranged in sequence to achieve particular fluid flow effects. The various apparatus in the flow sequence may be the same as each other or may be different, and indeed maybe dramatically different from each other. Furthermore, examples of fluid flow modification apparatus 10 according to the present invention may be combined with other fluid flow modification apparatus, such as the apparatus described in WO-A-2007/113335 and WO-A-2009/124939, thus providing an even wider range of available fluid, flow modification characteristics. The spacing between combined types of fluid flow modification apparatus can also be varied and tailored to affect fluid flow.

Other applications include aeronautical applications, such as for aircraft wings, flaps and rudders, etc., helicopter blades, etc. Similar applications include on the rotating blades of windmills or wind turbines, and on vehicle spoilers (which increase the downforce applied by the airflow passing over the moving vehicle). In cases such as these, the wing/blade/spoiler typically has a leading edge which faces the direction of movement and a trailing edge which faces away from the direction of movement and is the last edge of the surface over which air or another fluid flows in use. In such cases, providing at least the trailing edge as a multi-scale edge as described herein can significantly improve the lift and drag properties of the wing/blade/spoiler (it being understood that a spoiler in this context can be regarded as an upside-down wing such that the force is applied downward rather than upward as in an aircraft wing). Noise produced by the air flowing over the surface can also be reduced by the use of a multi-scale edge. It is understood that this is achieved at least in large part because the multi-scale edge results in a break up of the otherwise large vortices of air flowing off the trailing edge of a conventional wing/blade/spoiler: when a multi-scale edge is used for the trailing edge, a larger number (and in some instances, a very large number) of smaller vortices is produced off the trailing edge. These smaller vortices can break up and dissipate much more quickly. This can improve the air flow characteristics generally, such as increasing the lift or reducing the drag or both in the case of an aircraft wing, increasing the downforce or reducing the drag or both in the case of a vehicle spoiler, and potentially reducing noise (which can be a significant factor in the noise produced by aircraft when landing or taking off at airports). Another advantage of this is that the turbulence behind the moving aircraft, vehicle or wind turbine blade, etc. is reduced. In the case of aircraft, this all allows a higher throughput of aircraft at take off for example because it is necessary to allow the vortices behind, one aircraft that has just taken off to decay before the next aircraft can move along the runway through the otherwise turbulent air. In the case of wind turbines, this reduces stress on the whole mechanism of the turbine, reducing the likelihood of mechanical failure.

It may be noted that during the design of the apparatus, the magnitude of the surface area of the initial stage can be maintained so that the magnitude of the surface area of the final apparatus is the same (or at least they can be similar). At the same time, the length of the multi-scale edge is larger than that of the initial edge, and indeed increases at each iteration of the design process. The length of the multi-scale edge may be an order of magnitude or indeed many orders of magnitude larger than that of the initial edge. This can be of advantage in some applications. For example, the lift produced by an aircraft wing (or likewise the downforce produced by a vehicle spoiler) is typically a function of the magnitude of the surface area of the wing/spoiler. This total area can therefore be kept the same (or increased for example if desired) whilst increasing (possibly dramatically) the effective length of the trailing edge, and also providing a trailing edge that is multi-scale. Nevertheless, for other applications, it may be beneficial also to change the magnitude of the area from that of the initial stage. It is further noted that in general, in many applications, the ratio of the length of the actual edge to the length of the edge of the initial stage will be larger, and may be an order of magnitude or many orders of magnitude larger, than the ratio of the magnitude of the surface area of the final apparatus to the magnitude of the surface area of the initial stage. Thus, the edge of the surface can be longer, and in many cases this can be achieved without having to increase the area of the surface, relative to a comparable prior art arrangement. It is possible effectively to increase the length of the edge (relative to a comparable prior art arrangement) whilst decreasing the area of the surface if desired, though in some cases it may be desirable to increase the area.

Other products in which noise can be problematic include air conditioning systems, ventilation systems and fences that are used for example alongside highways or in proximity to airports, which can give rise to or pass low frequency noise which has a relatively large range and is found to be irritating to humans. Using a fluid flow modification apparatus as described above in any of these applications may provide for reduced low frequency noise because the profile of the perimeter of the fluid flow modification apparatus serves to break down large scale flow into smaller scale flows. As a result, a predominant element of the resultant noise arises from turbulent mixing at a higher frequency, which is often found deemed to be less irritating to human ears than low frequency noise.

The above embodiments are to be understood as illustrative examples of the invention. Further embodiments of the invention are envisaged. It is to be understood that any feature described in relation to anyone embodiment may be used alone, or in combination with other features described and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A fluid flow modification apparatus having a surface over and along which a fluid flows when in use, the surface including an edge of length Y over or past which the fluid flowing over the surface flows when in use, the edge having a first virtual boundary of length X such that a first portion of the apparatus within the first virtual boundary comprises a first opening and a second portion of the apparatus comprises a first projection which extends beyond the first virtual boundary to provide the edge,
where Y is greater than X, the edge being multi-scale;
wherein the first portion is on an opposite side of the first virtual boundary from the second portion;
wherein the first projection and the first opening define at least in part a second virtual boundary having a length greater than the length X of the first virtual boundary and less than the length Y of the edge, and at least one of the first projection and the first opening having at least one of a second projection and a second opening extending from the second virtual boundary;
wherein the at least one of the second projection and the second opening define at least in part a third virtual boundary having a length greater than the length of the second virtual bound and less than the length Y of the edge, and at least one of a third projection and a third opening extending from the third virtual boundary, wherein the first opening and first projection are larger than the at least one of the second projection and the second opening, and the at least one of the second projection and the second opening are larger than the at least one of the third projection and the third opening.

2. The apparatus according to claim 1, wherein at least one of the first portion and the second portion has a perimeter that is of irregular shape.

3. The apparatus according to claim 1, wherein at least one of the first portion and the second portion has a perimeter that is multi-scale.

4. The apparatus according to claim 1, comprising plural first portions and plural second portions.

5. The apparatus according to claim 1, wherein the area of the surface enclosed by the first virtual boundary is substantially the same as the area of the surface enclosed by a perimeter of the surface.

6. The apparatus according to claim 1, wherein the edge is a trailing edge of the surface.

7. The apparatus according to claim 1, wherein the surface has plural edges, at least two of the edges being multi-scale.

8. A vehicle spoiler comprising a fluid flow modification apparatus according to claim 1.

9. An aircraft wing comprising a fluid flow modification apparatus according to claim 1.

10. A wind turbine blade comprising a fluid flow modification apparatus according to claim 1.

11. A fluid mixing apparatus comprising a fluid flow modification apparatus according to claim 1.

12. A method of manufacturing a fluid flow modification apparatus, the method comprising:
forming an edge of a surface of the fluid flow modification apparatus, over and along which a fluid flows when in use to be multi-scale by:
defining a first virtual boundary of the edge of the surface;
selecting a first portion of the surface to be a first opening within the first virtual boundary;
selecting a second portion of the surface to be a first projection extending beyond the first virtual boundary;
defining a second virtual boundary of the edge of the surface with at least the first opening and the first projection;
at least one of selecting a second portion of the surface to be a second opening within the second virtual boundary and selecting a second portion of the surface to be a second projection extending beyond the second virtual boundary;
the length of the second virtual boundary being greater than the length of the first virtual boundary and less than the length of the edge of the surface;
defining a third virtual boundary of the edge of the surface with at least the second opening and the second projection;
at east one of selectin third portion of the surface to be a third opening within the third virtual boundary and selecting a third portion of the surface to be a third projection extending beyond the third boundary;
the length of the third boundary being greater than the length of the second virtual boundary and less than the length of the edge of the surface; and
manufacturing the fluid flow modification apparatus to have the multi-scale edge defined by the first opening and the first projection, the at least one of the second opening and second projection, and the at least one of the third opening and the third projection, wherein the first opening and first projection are larger than the at least one of the second projection and the second opening, and the at least one of the second projection and the second opening are larger than the at least one of the third projection and the third opening.

13. The method according to claim 12, wherein at least one of the first portion and the second portion has a perimeter that is of irregular shape.

14. The method according to claim 12, wherein at least one of the first portion and the second portion has a perimeter that is multi-scale.

15. The method according to claim 12, wherein the fluid flow modification apparatus comprises plural first portions and plural second portions.

16. The method according to claim 12, wherein the area of the surface enclosed by the third virtual boundary is substantially the same as the area of the surface enclosed by a perimeter of the surface.

17. The method according to claim 12, comprising manufacturing the fluid flow modification apparatus to have plural edges, at least two of the edges being multi-scale.

18. A fluid flow modification apparatus having a surface over and along which fluid flow when in use, the surface having a trailing edge over or past which the fluid can flow in use, the edge being formed with plural projections in which at least three of the projections have a different size and shape so that the edge is multi-scale, the edge being provided as at least a superposition of a third pattern of projections on a second pattern of projections, with the second pattern of projections being a superposition on a first pattern of projections.

* * * * *